United States Patent
Hayashi

(10) Patent No.: US 12,284,030 B2
(45) Date of Patent: Apr. 22, 2025

(54) TIME-DIVISION MULTIPLEXING COMMUNICATION SYSTEM AND RECORDING MEDIUM

(71) Applicant: Mitsubishi Electric Corporation, Tokyo (JP)

(72) Inventor: Tomoyuki Hayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 350 days.

(21) Appl. No.: 17/790,510

(22) PCT Filed: Mar. 6, 2020

(86) PCT No.: PCT/JP2020/009731
§ 371 (c)(1),
(2) Date: Jul. 1, 2022

(87) PCT Pub. No.: WO2021/176697
PCT Pub. Date: Sep. 10, 2021

(65) Prior Publication Data
US 2023/0069599 A1  Mar. 2, 2023

(51) Int. Cl.
H04J 3/16 (2006.01)
H04W 72/0446 (2023.01)

(52) U.S. Cl.
CPC ........... *H04J 3/16* (2013.01); *H04W 72/0446* (2013.01)

(58) Field of Classification Search
None
See application file for complete search history.

(56) References Cited

U.S. PATENT DOCUMENTS 6,157,656 A * 12/2000 Lindgren .............. H04J 3/1682 370/468
6,944,148 B1 * 9/2005 Gehring ................ H04J 3/1682 370/347

(Continued)

FOREIGN PATENT DOCUMENTS

JP 2002-525915 A 8/2002
JP 2009-38477 A 2/2009

OTHER PUBLICATIONS

International Search Report and Written Opinion mailed on Jun. 30, 2020, received for PCT Application PCT/JP2020/009731, filed on Mar. 6, 2020, 8 pages including English Translation.

*Primary Examiner* — Duc T Duong
(74) *Attorney, Agent, or Firm* — XSENSUS LLP

(57) ABSTRACT

A master node (11) transmits a bandwidth extension instruction including an extension duration $D_{EX}$, an extension time slot number $N_{EX}$, and an extension time $T_{EX}$ to multiple slave nodes (12). The master node (11) and the multiple slave nodes (12) execute a bandwidth extension process of modifying a communication frame such that the start time of the following cycle following the cycle designated by the extension time $T_{EX}$ is advanced by the extension duration $D_{EX}$, the time slot identified by the extension time slot number $N_{EX}$ is extended by the extension duration $D_{EX}$, and the time slot identified by the shortening time slot number $N_{SH}$ is shortened by the extension duration $D_{EX}$. The master node (11) and the slave nodes (12) communicate with each other using the assigned time slots.

8 Claims, 7 Drawing Sheets

(56) References Cited

U.S. PATENT DOCUMENTS

| | | | | |
|---|---|---|---|---|
| 6,975,613 | B1* | 12/2005 | Johansson | H04W 72/12 370/468 |
| 6,990,120 | B1 | 1/2006 | Lindgren et al. | |
| 2007/0063872 | A1* | 3/2007 | Ho | G07B 15/06 340/928 |
| 2007/0282492 | A1* | 12/2007 | Valovage | G08G 5/0008 701/3 |
| 2009/0034421 | A1 | 2/2009 | Kodama et al. | |
| 2012/0155284 | A1* | 6/2012 | Shaffer | H04W 72/0446 370/242 |
| 2014/0376567 | A1* | 12/2014 | Hui | H04W 72/1263 370/458 |
| 2017/0345297 | A1* | 11/2017 | Umehara | G08G 1/0133 |
| 2020/0275301 | A1* | 8/2020 | Jamin | H04W 28/0247 |

* cited by examiner

FIG. 7
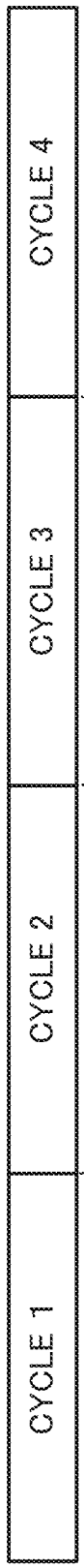
⟨NO EXECUTION OF BANDWIDTH EXTENSION⟩
⟨EXECUTION OF BANDWIDTH EXTENSION BY SINGLE STEP⟩
EXTENSION DURATION $D_{EX}$
⟨EXECUTION OF BANDWIDTH EXTENSION BY MULTIPLE STEP⟩
EXTENSION DURATION $D_{SH}$
EXTENSION DURATION $D_{SH} \times 2$
EXTENSION DURATION $D_{SH} \times 3$

TIME-DIVISION MULTIPLEXING COMMUNICATION SYSTEM AND RECORDING MEDIUM

CROSS-REFERENCE TO RELATED APPLICATION

The present application is based on PCT filing PCT/JP2020/009731, filed Mar. 6, 2020, the entire contents of which are incorporated herein by reference.

TECHNICAL FIELD

The present disclosure relates to a time division multiplexing communication system, a method for time division multiplexing communication, and a program.

BACKGROUND ART

A procedure of guaranteeing bandwidths in a typical time division multiplexing network involves periodically executing communication processes at predetermined intervals, dividing a single cycle into time slots having a predetermined duration, and assigning the communication processes to be subject to bandwidth guarantee to the individual time slots. In such a time division multiplexing network, some existing techniques (for example, Patent Literature 1) have proposed a method of extending the bandwidth for a communication process to be subject to bandwidth guarantee during the communication process.

Patent Literature 1 discloses a method of varying the bandwidth of a line switching channel in a time division multiplexing network. In the method of varying the bandwidth disclosed in Patent Literature 1, a bitstream is divided into repetitive frames having a predetermined duration, and each of the frames is divided into multiple time slots. Patent Literature 1 claims that one or more time slots can be assigned to a single channel, and an increase in the number of time slots assigned to a channel can achieve extension of the bandwidth of the channel.

Other techniques (for example, Patent Literature 2) have proposed a method of extending a time slot itself in a time division multiplexing network. Patent Literature 2 discloses a communication system in which communication cycles having a predetermined duration are repeated to achieve time division multiplexing communication. A communication cycle is divided into a periodic transmission segment, an event transmission segment, and a network idle time, and each segment is divided into multiple time slots. Patent Literature 2 claims that the event transmission segment includes a time slot having a variable duration, and the duration of the time slot can be extended to a duration calculated by multiplying the minimum unit by an integral number.

CITATION LIST

Patent Literature

Patent Literature 1: Unexamined Japanese Patent Application Publication (Translation of PCT Application) No. 2002-525915

Patent Literature 2: Unexamined Japanese Patent Application Publication No. 2009-38477

SUMMARY OF INVENTION

Technical Problem

In the method of assigning one or more time slots to a single channel and extending the bandwidth as disclosed in Patent Literature 1, the time slots may fail to be successively assigned to a single channel in some cases. In these cases, the maximum duration from the start until the end of communication through the channel within a single repetitive frame is equal to the duration of the repetitive frames, and cannot be shortened any more. That is, this situation may cause time not used for communication and thus wasted. The wasted time is accumulated in the case of periodical transmission and reception of data of the identical type, such as communication between programmable logic controllers (PLCs), and unfortunately leads to a reduction in data transmission rate.

Although the bandwidth of the time slot in the event transmission segment can be extended during communication in the time division multiplexing network disclosed in Patent Literature 2, the extension of the bandwidth unfortunately causes a delay in the start time and the end time of communication in the following time slots. The delay leads to failure in guarantee of the bandwidths of the individual time slots.

An objective of the present disclosure, which has been accomplished in view of the above-described situation, is to provide a time division multiplexing communication system, a method for time division multiplexing communication, and a program that can guarantee the bandwidths of the individual time slots without any delay in communication in the following time slots through extension of some time slots.

Solution to Problem

In order to achieve the above objective, a time division multiplexing communication system according to an aspect of the present disclosure includes a master node and slave nodes to communicate with the master node using a communication frame containing time slots. The master node includes a bandwidth extension instructor to transmit a bandwidth extension instruction including an extension duration, an extension time slot number, and an extension time, to the slave nodes. Each of the master node and the slave nodes includes a bandwidth extension processor to modify the communication frame such that a start time of a following cycle following a cycle designated by the extension time is advanced by the extension duration, a time slot identified by the extension time slot number is extended by the extension duration, and a time slot identified by a shortening time slot number is shortened by the extension duration.

Advantageous Effects of Invention

The time division multiplexing communication system according to an aspect of the present disclosure shortens the shortening time slot and extends the extension time slot that are designated by the bandwidth extension instruction received from the master node, and can therefore guarantee the bandwidths of the individual time slots without any delay in communication in the following time slots through extension of some time slots.

BRIEF DESCRIPTION OF DRAWINGS

FIG. 7 is a diagram for describing the difference between communication frames caused by different extension repetition numbers.

DESCRIPTION OF EMBODIMENTS

Embodiment 1

Embodiment 1 is described in detail below with reference to the accompanying drawings.

Figure 1:
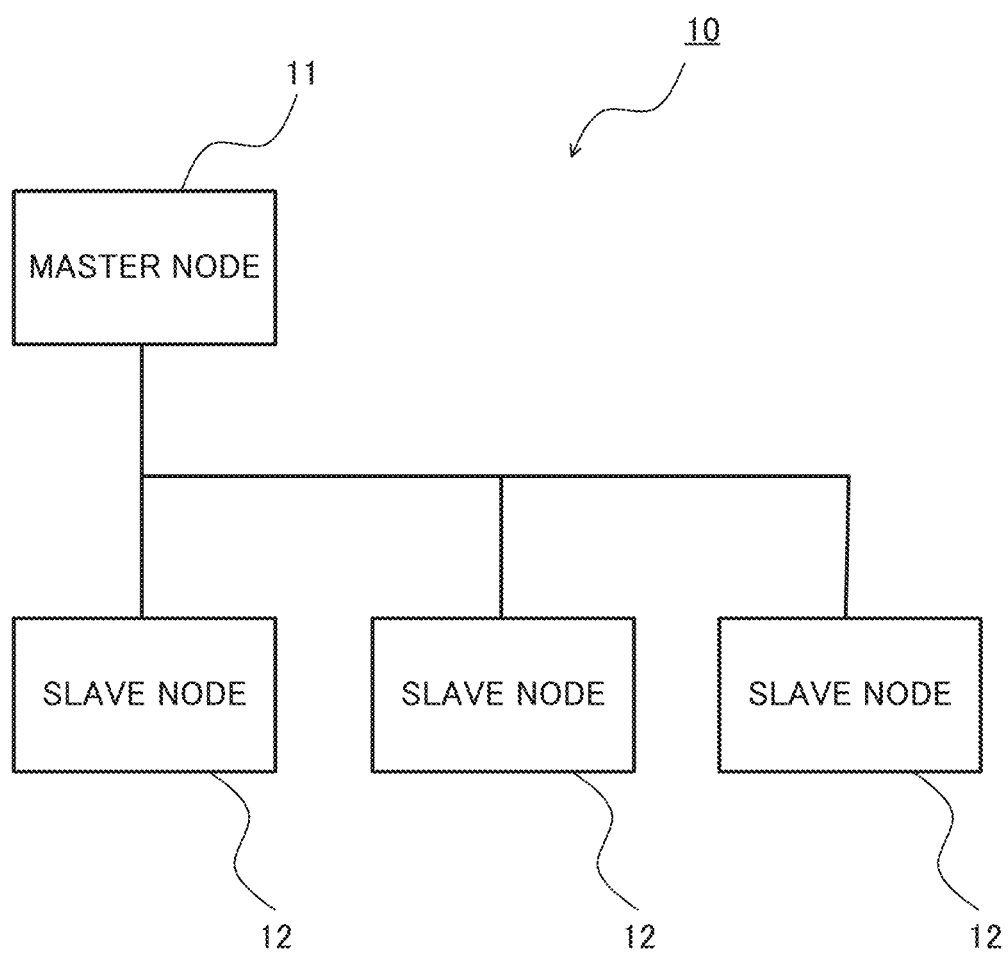
FIG. 1 is a block diagram illustrating an exemplary configuration of a time division multiplexing communication system according to Embodiment 1.

FIG. 1 a block diagram illustrating an exemplary configuration of a time division multiplexing communication system 10 according to Embodiment 1. As illustrated in FIG. 1, the time division multiplexing communication system 10 includes a master node 11 and multiple slave nodes 12. The master node 11 and the slave nodes 12 are connected so as to be communicable with each other. The communication may be performed through any wired or wireless method in a time division multiplexing scheme.

Figure 2:
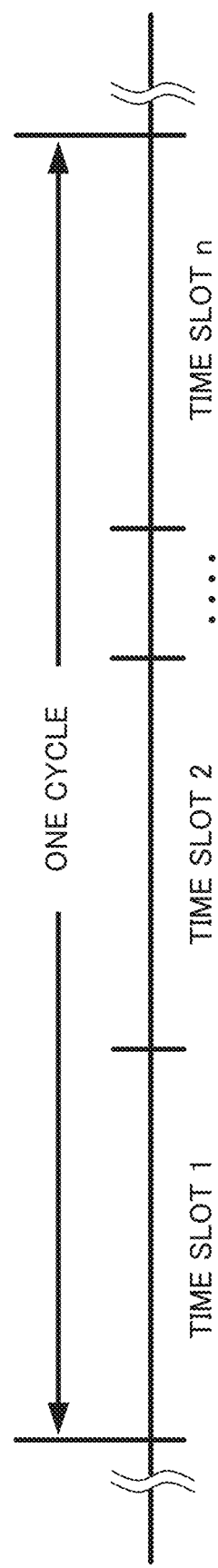
FIG. 2 is a schematic diagram illustrating one cycle of a communication frame.

FIG. 2 is a schematic diagram illustrating one cycle of a communication frame applied to communication between the nodes. One cycle of the communication frame is divided into multiple time slots. FIG. 2 illustrates an example in which the communication frame is divided into n time slots (n is a natural number). The time slots may have mutually different durations. The slave nodes 12 transmit and receive data using time slots assigned in advance by the master node 11. The communication frame is made of repetition of the cycle illustrated in FIG. 2.

Figure 3:
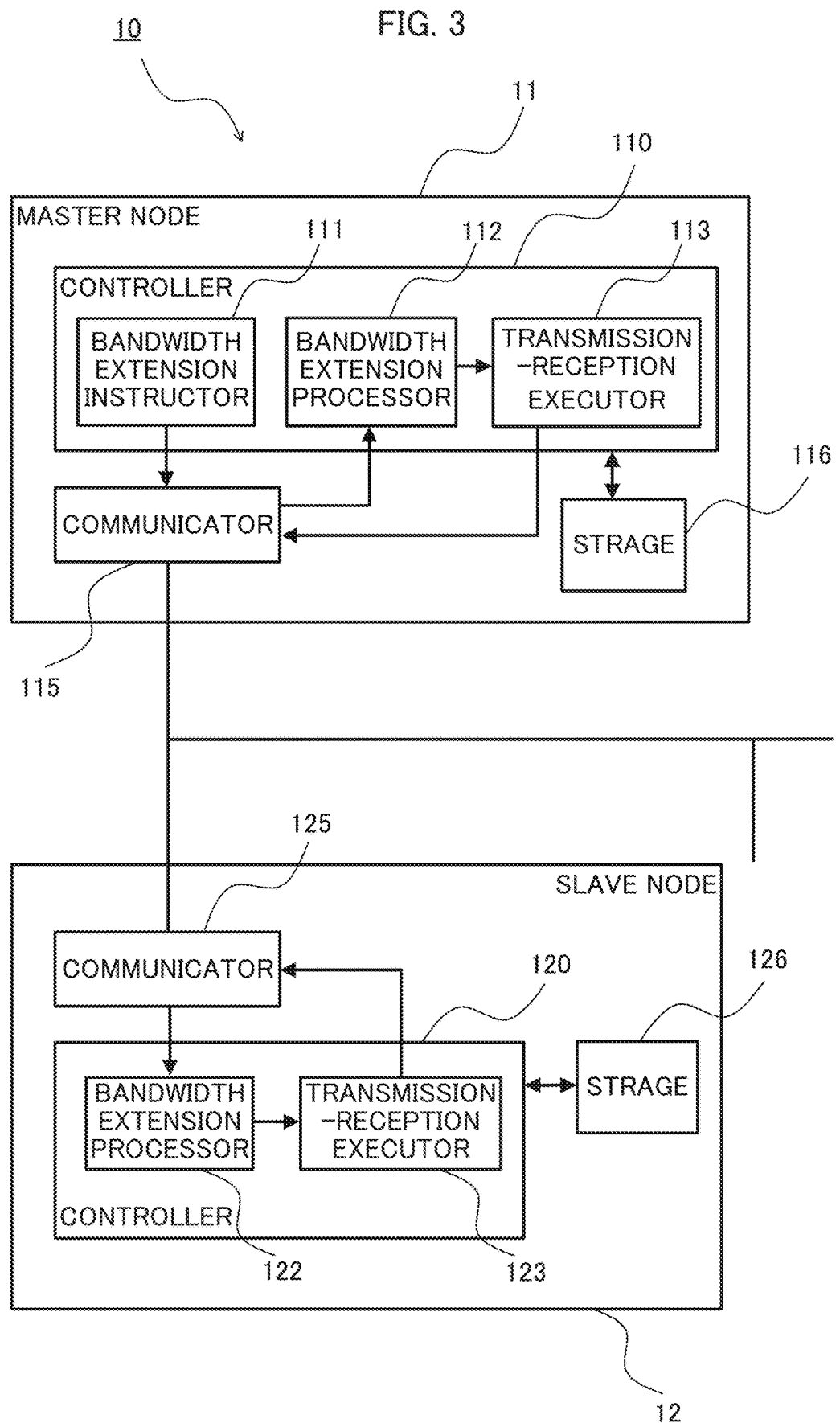
FIG. 3 is a functional block diagram illustrating exemplary functional configurations of a master node and a slave node.

FIG. 3 is a functional block diagram illustrating exemplary functional configurations of the master node 11 and the slave node 12. The master node 11 includes a controller 110, a communicator 115, and a storage 116, as illustrated in FIG. 3. The controller 110 is an arithmetic processor to execute programs stored in the storage 116. A typical example of the controller 110 is a central processing unit (CPU). The controller 110 executes a program and thereby serves as a bandwidth extension instructor 111 to transmit a bandwidth extension instruction to the slave nodes 12, a bandwidth extension processor 112 to modify the communication frame in accordance with the bandwidth extension instruction, and a transmission-reception executor 113 to transmit and receive data during assigned time slots in the communication frame.

Each of the slave nodes 12 includes a controller 120, a communicator 125, and a storage 126, as illustrated in FIG. 3. The controller 120 is an arithmetic processor to execute programs stored in the storage 126. A typical example of the controller 120 is a central processing unit (CPU). The controller 120 executes a program and thereby serves as a bandwidth extension processor 122 to modify the communication frame in accordance with the bandwidth extension instruction received from the master node 11, and a transmission-reception executor 123 to transmit and receive data during assigned time slots in the communication frame.

Figure 4:
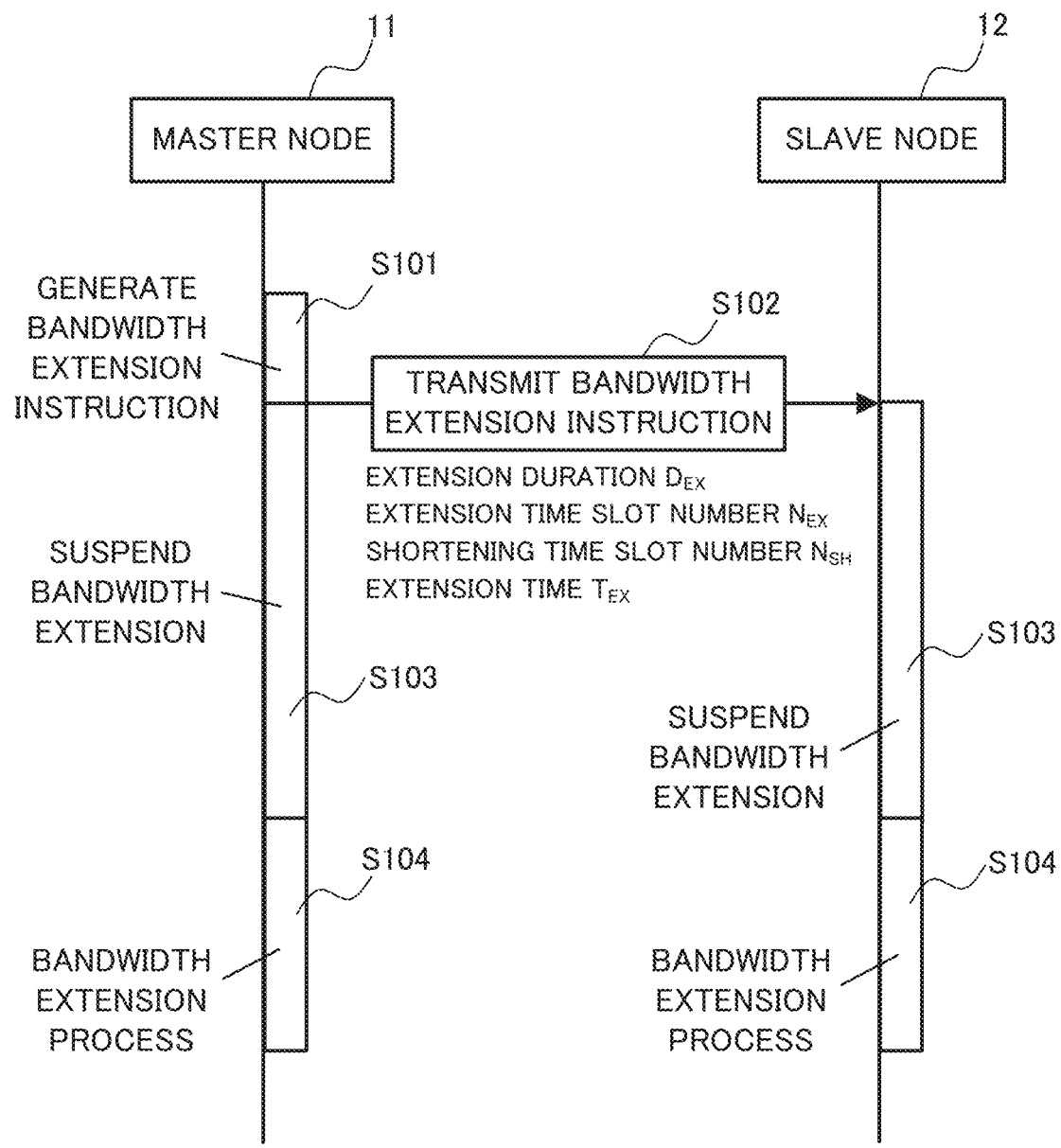
FIG. 4 is a sequence diagram illustrating operations of the master node and the slave node according to Embodiment 1.

An operation of the time division multiplexing communication system 10 having the above-described configuration is described below with reference to the sequence diagram of FIG. 4. FIG. 4 is a sequence diagram illustrating operations of the master node 11 and the slave node 12 according to Embodiment 1.

First, in order to extend a specific time slot, the master node 11 determines an extension duration $D_{EX}$, an extension time slot number $N_{EX}$, a shortening time slot number $N_{SH}$, and an extension time $T_{EX}$, and generates a bandwidth extension instruction (Step S101). The extension of a time slot is executed in response to a request to increase communication capacity from any of the slave nodes 12 or in accordance with an instruction from a higher-level device, for example.

The extension duration $D_{EX}$ indicates the duration of the time slot to be extended in response to an increase in communication capacity, and equals to the difference between the duration of the time slot before extension and the duration of the time slot after extension. The extension time slot number $N_{EX}$ identifies the time slot assigned in advance to the slave node 12 that requires an increase in communication capacity. The extension time slot number $N_{EX}$ may be the identifier of the predetermined time slot or the number indicating the position relative to the beginning of the cycle.

The shortening time slot number $N_{SH}$ identifies the time slot to be shortened during bandwidth extension. The time slot identified by the shortening time slot number $N_{SH}$ is preliminarily found to have a small amount of data traffic and is thus allowed to be shortened, for example. The extension time $T_{EX}$ designates the cycle in which bandwidth extension is executed. The extension time $T_{EX}$ may be the actual time or the number of cycle.

The master node 11 then transmits the bandwidth extension instruction to all the slave nodes 12 in the network (Step S102). The master node 11 transmits the bandwidth extension instruction using the time slots assigned to the master node 11. Alternatively, before the start of communication between the master node 11 and the slave node 12, the master node 11 may use any of the time slots illustrated in FIG. 2 to transmit the bandwidth extension instruction.

The bandwidth extension instruction to be transmitted includes information on the extension duration $D_{EX}$, the extension time slot number $N_{EX}$, the shortening time slot number $N_{SH}$, and the extension time $T_{EX}$. The bandwidth extension instruction may exclude the shortening time slot number $N_{SH}$ in the case where the time slot to be shortened during bandwidth extension has been determined in advance and already set in all the nodes.

After transmission of the bandwidth extension instruction, the master node 11 continues communication using the time slots without extension until the beginning of the cycle designated by the extension time $T_{EX}$, and suspends bandwidth extension (Step S103). Also, after reception of the bandwidth extension instruction from the master node 11, the slave node 12 continues communication using the time slots without extension until the beginning of the cycle designated by the extension time $T_{EX}$, and suspends bandwidth extension (Step S103).

The master node 11 and the slave node 12 then execute a bandwidth extension process in the cycle designated by the extension time $T_{EX}$ and the following cycles (Step S104).

Figure 5:
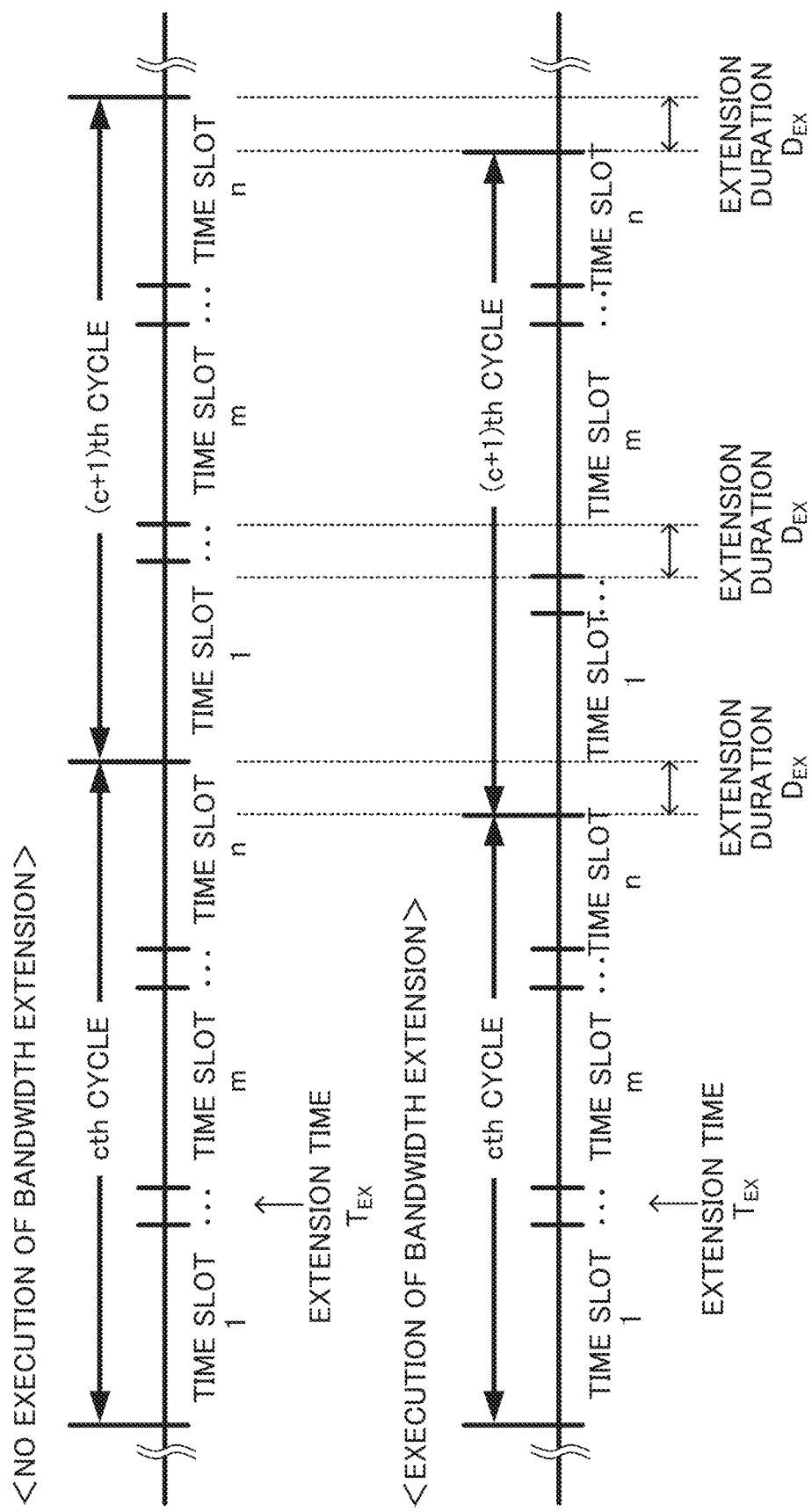
FIG. 5 is a schematic diagram illustrating communication frames in the case of no execution of a bandwidth extension process and in the case of execution of the bandwidth extension process.

The bandwidth extension process executed in Step S104 is specifically described below with reference to FIG. 5. FIG. 5 is a schematic diagram illustrating communication frames in the case of no execution of a bandwidth extension process and in the case of execution of the bandwidth extension process. In FIG. 5, the cth cycle involves the extension time $T_{EX}$ and indicates the cycle designated by the extension time $T_{EX}$. The (c+1)th cycle indicates the cycle subsequent to the cth cycle.

A time slot m is identified by the extension time slot number $N_{EX}$. A time slot n is identified by the shortening time slot number $N_{SH}$. The time slot m may precede the time slot n, and vice versa.

The following description is directed to exemplary execution of bandwidth extension with reference to the lower communication frame in FIG. 5. First, the master node 11 and the slave node 12 shorten the time slot n by the extension duration $D_{EX}$ in the cth cycle. Although the time slot n is the last time slot in the cth cycle in the example illustrated in FIG. 5, in the case where other time slots follow the time slot n, the start time and the end time of each of the time slots following the time slot n are advanced by the extension duration $D_{EX}$.

Then, in each of the (c+1)th cycle and the following cycles, the start time and the end time of the cycle are advanced by the extension duration $D_{EX}$. The time slot m in the (c+1)th cycle is extended by the extension duration $D_{EX}$. The time slot n in the (c+1)th cycle is shortened by the extension duration $D_{EX}$.

Using the communication frame modified as described above, the transmission-reception executors 113 and 123 of the master node 11 and the slave node 12 then transmit and receive data. This process can achieve extension of the time slot m designated by the extension time slot number $N_{EX}$ without any delay in the following time slots.

As described above, in the time division multiplexing communication system 10 according to the embodiment, the master node 11 provides the multiple slave nodes 12 with the bandwidth extension instruction including the extension duration $D_{EX}$, the extension time slot number $N_{EX}$, the shortening time slot number $N_{SH}$, and the extension time $T_{EX}$. The master node 11 and the multiple slave nodes 12 then execute the bandwidth extension process of modifying the communication frame such that the start time of the following cycle following the cycle designated by the extension time $T_{EX}$ is advanced by the extension duration $D_{EX}$, the time slot identified by the extension time slot number $N_{EX}$ is extended by the extension duration $D_{EX}$, and the time slot identified by the shortening time slot number $N_{SH}$ is shortened by the extension duration $D_{EX}$. This process can guarantee the bandwidths of the individual time slots without any delay in communication in the following time slots through extension of some time slots.

Embodiment 2

Embodiment 2 is described in detail below with reference to FIGS. 6 and 7. In a time division multiplexing communication system 10 according to Embodiment 2, the master node 11 and the multiple slave nodes 12 also execute a bandwidth extension process of extending the duration of the designated time slot, in accordance with the bandwidth extension instruction transmitted from the master node 11. The time division multiplexing communication system 10 according to Embodiment 2 has the hardware configuration identical to that in Embodiment 1, but the contents of the bandwidth extension instruction and the bandwidth extension process in Embodiment 2 differ from those in Embodiment 1.

Figure 6:
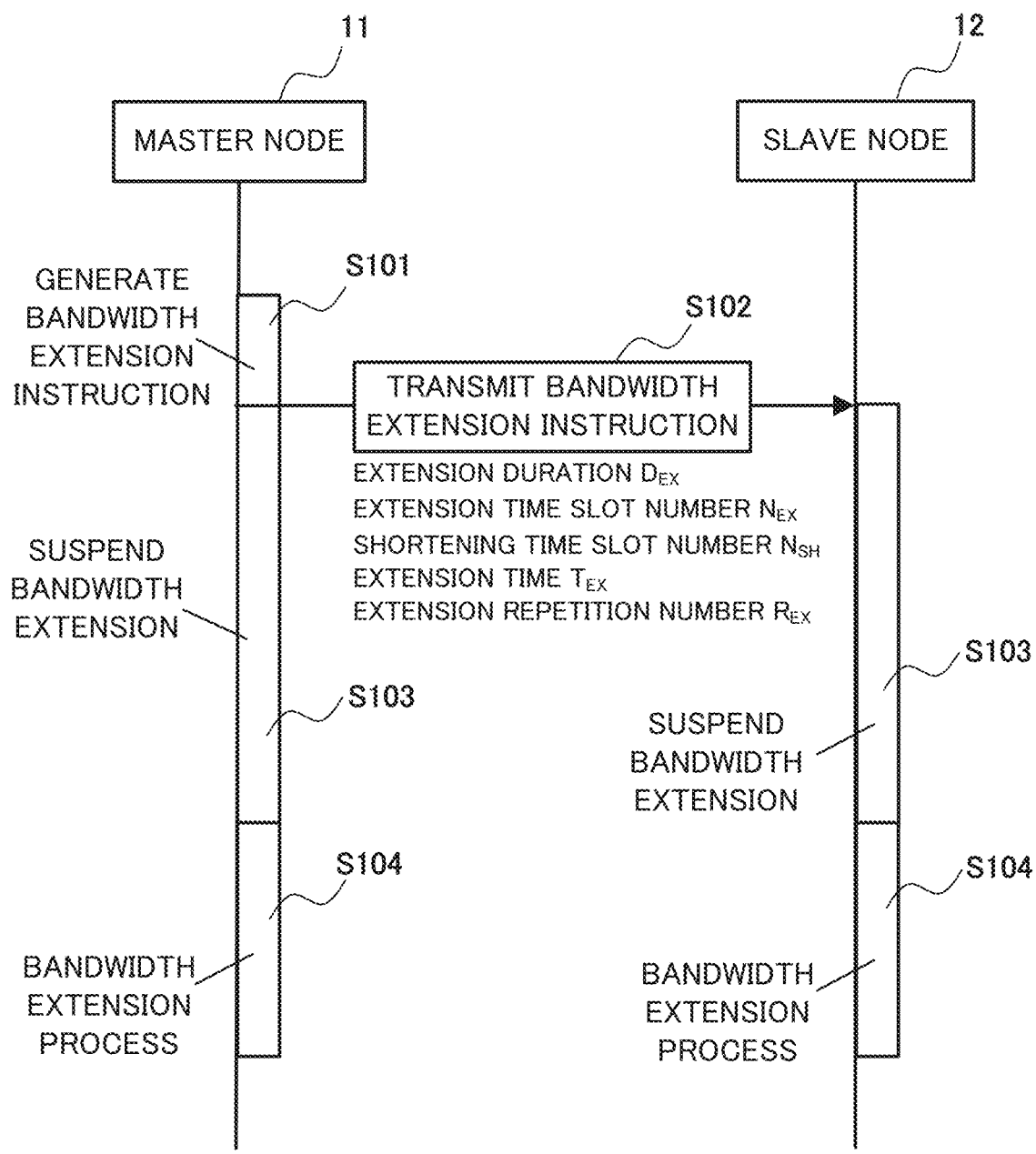
FIG. 6 is a sequence diagram illustrating operations of a master node and a slave node according to Embodiment 2.

FIG. 6 is a sequence diagram illustrating operations of the master node 11 and the slave node 12 according to Embodiment 2. First, in order to extend a specific time slot, the master node 11 determines an extension duration $D_{SH}$, an extension time slot number $N_{EX}$, a shortening time slot number $N_{SH}$, an extension time $T_{EX}$, and an extension repetition number $R_{EX}$, and generates a bandwidth extension instruction (Step S101). The extension repetition number $R_{EX}$ indicates the number of cycles subject to the bandwidth extension process. The extension duration $D_{SH}$ indicates a duration to be extended in a single cycle in the bandwidth extension process.

The master node 11 then transmits the bandwidth extension instruction to all the slave nodes 12 in the network (Step S102). The bandwidth extension instruction includes information on the extension repetition number $R_{EX}$ in addition to the extension duration $D_{SH}$, the extension time slot number $N_{EX}$, the shortening time slot number $N_{SH}$, and the extension time $T_{EX}$ as in the Embodiment 1.

The master node 11 and the slave node 12 continue communication using the time slots without extension until the beginning of the cycle designated by the extension time $T_{EX}$ and suspend bandwidth extension (Step S103).

The master node 11 and the slave node 12 then execute the bandwidth extension process in the cycle designated by the extension time $T_{EX}$ and the following cycles (Step S104). As in Embodiment 1, the time slot m is extended by the extension duration $D_{SH}$ and the time slot n is shortened by the extension duration $D_{SH}$ in the (c+1)th cycle subsequent to the cth cycle designated by the extension time $T_{EX}$.

The master node 11 and the slave node 12 cause the bandwidth extension process executed in the (c+1)th cycle to be repeated the number of times designated by the extension repetition number $R_{EX}$ in the cycles following the (c+1)th cycle. The repeated process gradually extends the time slot m designated by the extension time slot number $N_{EX}$.

Effects of repetition of the bandwidth extension process are described below with reference to FIG. 7. FIG. 7 is a diagram for describing the difference between communication frames caused by different extension repetition numbers. In the case of execution of bandwidth extension by a single step, the time slot identified by the shortening time slot number $N_{SH}$ must be shorted by the extension duration $D_{EX}$ in the cycle 1, leading to significant effects on the communication capacity in the time slot identified by the shortening time slot number $N_{SH}$.

In contrast, in the case of execution of bandwidth extension by multiple steps as illustrated in FIG. 7, the bandwidth shortening of the time slot identified by the shortening time slot number $N_{SH}$ is only required to reach the extension duration $D_{SH}$ in total in multiple cycles, so that the bandwidth shortening brings about reduced effects on the time slot identified by the shortening time slot number $N_{SH}$.

As described above, in the time division multiplexing communication system 10 according to the embodiment, the master node 11 provides the multiple slave nodes 12 with the bandwidth extension instruction including the extension duration $D_{SH}$, the extension time slot number $N_{EX}$, the shortening time slot number $N_{SH}$, the extension time $T_{EX}$, and the extension repetition number $R_{EX}$. The master node 11 and the multiple slave nodes 12 then cause the bandwidth extension process of modifying the communication frame such that the time slot identified by the extension time slot number $N_{EX}$ is extended by the extension duration $D_{SH}$ and the time slot identified by the shortening time slot number $N_{SH}$ is shortened by the extension duration $D_{SH}$, to be repeated $R_{EX}$ times. This repeated process can reduce the duration shorted m a single cycle and thus mitigate the effects of bandwidth shortening on the time slot to be shortened.

(Modification)

The above-described embodiments may be subject to various modifications.

Although the master node 11 transmits the bandwidth extension instruction in which a single extension time slot number and a single shortening time slot number are designated in the above-described embodiments, the master node 11 may also designate multiple extension time slot numbers or multiple shortening time slot numbers and then execute bandwidth extension.

The hardware configuration and the contents of processing at the controllers 110 and 120 in the above-described embodiments are mere examples and may be arbitrarily varied and modified. The individual functions performed by the controllers 110 and 120 can be achieved by not only a dedicated system but also an ordinary computer system.

For example, the program for executing the operations in the above-described embodiments may be stored in a non-transitory computer-readable recording medium, such as compact disc read-only memory (CD-ROM), digital versatile disc (DVD), magneto optical disc (MO), or memory card, for distribution and then installed in a computer to enable the computer to perform the individual functions. In the case where the individual functions are shared by an operating system (OS) and applications or achieved by cooperation of the OS and the applications, only the components other than the OS may be stored in a non-transitory recording medium.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

10 Time division multiplexing communication system
11 Master node
12 Slave node
110, 120 Controller
111 Bandwidth extension instructor
112, 122 Bandwidth extension processor
113, 123 Transmission-reception executor
115, 125 Communicator
116, 126 Storage

The invention claimed is:

1. A time division multiplexing communication system, comprising:
a master node; and
slave nodes to communicate with the master node using a communication frame containing time slots, wherein
the master node comprises a communicator to transmit a bandwidth extension instruction to the slave nodes, the bandwidth extension instruction including an extension duration, an extension time slot number, and an extension time, and
each of the master node and the slave nodes comprises processing circuitry to modify the communication frame such that,
a start time of a following cycle following a cycle designated by the extension time is advanced by the extension duration,
a time slot identified by the extension time slot number is extended by the extension duration, and
a time slot identified by a shortening time slot number is shortened by the extension duration.

2. The time division multiplexing communication system according to claim 1, wherein
the bandwidth extension instruction further includes the shortening time slot number, and
each processing circuitry shortens the time slot identified by the shortening time slot number in each of the cycle designated by the extension time and following cycles, and thereby advances the start time of each of the following cycles following the cycle designated by the extension time.

3. The time division multiplexing communication system according to claim 2, wherein
the bandwidth extension instruction further includes an extension repetition number, and
each processing circuitry repeats modifying the communication frame such that, during a number of cycles designated by the extension repetition number,
the start time of the cycle is advanced,
the time slot identified by the extension time slot number is extended, and
the time slot identified by the shortening time slot number is shortened.

4. The time division multiplexing communication system according to claim 1, wherein
the shortening time slot number that identifies a time slot to be shortened during bandwidth extension is determined in advance, and
each processing circuitry shortens the time slot identified by the shortening time slot number in each of the cycle designated by the extension time and following cycles, and thereby advances the start time of each of the following cycles following the cycle designated by the extension time.

5. The time division multiplexing communication system according to claim 4, wherein
the bandwidth extension instruction further includes an extension repetition number, and
each processing circuitry repeats modifying the communication frame such that, during a number of cycles designated by the extension repetition number,
the start time of the cycle is advanced,
the time slot identified by the extension time slot number is extended, and
the time slot identified by the shortening time slot number is shortened.

6. The time division multiplexing communication system according to claim 1, wherein
the bandwidth extension instruction further includes an extension repetition number, and each processing circuitry repeats modifying the communication frame such that, during a number of cycles designated by the extension repetition number,
the start time is advanced,
the time slot identified by the extension time slot number is extended, and
the time slot identified by the shortening time slot number is shortened.

7. A non-transitory computer-readable recording medium storing a program, the program causing a computer of a master node in a time division multiplexing communication system for communication using a communication frame containing time slots, to
transmit a bandwidth extension instruction to slave nodes, the bandwidth extension instruction including an extension duration, an extension time slot number, and an extension time,
advance a start time of a following cycle following a cycle designated by the extension time by the extension duration,
extend a time slot identified by the extension time slot number by the extension duration, and
shorten a time slot identified by a shorting time slot number by the extension duration.

8. A non-transitory computer-readable recording medium storing a program, the program causing a computer of a slave node in a time division multiplexing communication system for communication using a communication frame containing time slots, to,
when a bandwidth extension instruction including an extension duration, an extension time slot number, and an extension time is received from a master node,
advance a start time of a following cycle following a cycle designated by the extensions time by the extension duration,
extend a time slot identified by the extension time slot number by the extension duration, and
shorten a time slot identified by a shortening time slot number by the extension duration.

* * * * *